June 7, 1938.    O. K. KASPEREIT    2,119,545
PRISM
Filed March 22, 1937

Inventor
Otto K. Kaspereit
By W. N. Roach
Attorney

Patented June 7, 1938

2,119,545

UNITED STATES PATENT OFFICE 2,119,545

PRISM

Otto K. Kaspereit, Philadelphia, Pa.

Application March 22, 1937, Serial No. 132,356

1 Claim. (Cl. 88—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a prism.

The purpose of the invention is to provide a one-piece prism designed to deviate the line of sight through an angle of 90° in the horizontal plane and through an angle of 80° in the vertical plane and to revert the image.

Figure 1:
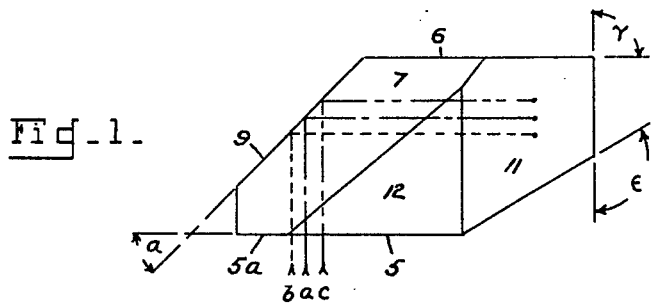
Figure 2:
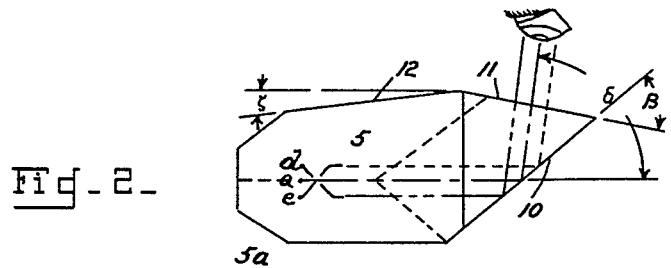
Figure 3:
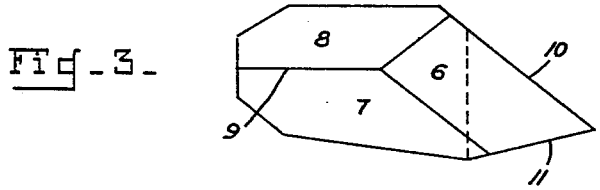
Figure 4:
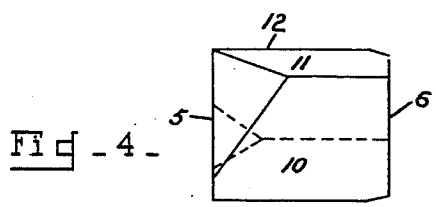

A practical embodiment of the invention is illustrated in the accompanying drawing, in which, Fig. 1 is a plan view, Fig. 2 is a view in elevation of the entrant face, Fig. 3 is a view in elevation of the side opposite to the entrant face, Fig. 4 is a view in end elevation.

Referring to the drawing by characters of reference, the angle alpha is equal to 45°, the angle beta is equal to 50°, the angle gamma is equal to 90°, the angle delta is equal to 80°, the angle epsilon is equal to 120°, and the angle zeta is equal to 7° 9′ 20″.

The prism consists of a single block having parallel faces 5 and 6 as seen in Fig. 1, a portion 5ᵃ of the face 5 being the entrant face. Opposite the face 5 is a roof-angle surface having faces 7 and 8 inclined to each other at an angle of 90° and its ridge 9, extended, making an angle of 45° with the face 5, extended. A reflecting face 10 disposed in the path of the rays reflected by the roof-angle faces and at an angle of 40° to the plane bisecting the roof angle forms one side of a 50-80-50-degree prism as seen in Fig. 2. An emergent face 11 is at an angle of 50° to the face 10 and perpendicular to the path of the rays reflected by the face 10. The plane surface 12 joining the entrant and emergent faces and one of the roof-angle faces is at an angle of 7° 9′ 20″ to the horizontal.

The rays of light entering the prism at the face 5ᵃ are deviated by the roof-angle faces 7 and 8 through an angle 90° in the horizontal plane and are directed onto the face 10 which deviates them through an angle of 80° in the vertical plane, that is 80° to the plane bisecting the roof angle. An inspection of the horizontal rays a, b, c, and the vertical rays a, d, e, shows that the image will appear reverted in the emergent face 11.

I claim:

A single prism for inverting an image embodying an entrant face for rays of light, roof-angle reflecting faces disposed opposite to the entrant face and having its ridge at an angle of 45° thereto, said roof-angle faces deviating rays of light through 90° in a plane bisecting the roof angle, a reflecting face disposed in the path of the rays reflected by the roof-angle faces and at an angle of 40° to the plane bisecting the roof angle for deviating the rays 80° to the plane bisecting the roof angle and an emergent face making an angle of 50° with said reflecting face.

OTTO K. KASPEREIT.